(12) United States Patent
Grigoryan

(10) Patent No.: US 7,346,498 B2
(45) Date of Patent: Mar. 18, 2008

(54) FAST PAIRED METHOD OF A 1-D CYCLIC CONVOLUTION REALIZATION

(75) Inventor: Artyom M. Grigoryan, San Antonio, TX (US)

(73) Assignee: Board of Regents, the University of Texas System, Austin, TX (US)

( * ) Notice: Subject to any disclaimer, the term of this patent is extended or adjusted under 35 U.S.C. 154(b) by 840 days.

(21) Appl. No.: 10/356,398

(22) Filed: Jan. 31, 2003

(65) Prior Publication Data

US 2004/0158459 A1     Aug. 12, 2004

(51) Int. Cl.
*G10L 11/00*     (2006.01)
(52) U.S. Cl. .................................................. 704/203
(58) Field of Classification Search .................. None
See application file for complete search history.

(56) References Cited

U.S. PATENT DOCUMENTS

| | | | | |
|---|---|---|---|---|
| 4,797,923 | A * | 1/1989 | Clarke | 704/203 |
| 5,526,446 | A * | 6/1996 | Adelson et al. | 382/260 |
| 6,119,080 | A * | 9/2000 | Liu et al. | 704/203 |
| 6,459,818 | B1 * | 10/2002 | George | 382/260 |
| 6,625,629 | B1 * | 9/2003 | Garcia | 708/315 |

OTHER PUBLICATIONS

Agarwal and Cooley, "New algorithms for digital convolution," *IEEE Transactions Conf., Acoust., Speech, Signal Processing*, ASSP-25:392-409, 1977.

Agarwal and Cooley, "New algorithms for digital convolution," in: *Intern. Conf. Acouts. Speech Signal Processing*, 360-362, 1977.

Agarwal and Burrus, "Fast one-dimensional digital convolution by multidimensional techniques," *IEEE Trans. on Acoustics, Speech, Signal Processing.*, ASSP-22:1-10, 1974.

Bhattacharya and Agarwal, "Number theoretic techniques for computation of digital convolution," *IEEE Trans. Acoustic, Speech, Signal Proc.*, ASSP-32(3):507-511, 1984.

Burrus and Parks, *DFT/FFT and Convolution Algorithms: Theory and Implementation*, New York: Wiley, 1985.

Ersoy, *Fourier-Related Transform, Fast Algorithms and Applications*, Prentice Hall, 1997.

Grigoryan and Agaian, "Split manageable efficient algorithm for Fourier and Hadamard transforms," *IEEE Transaction on Signal Processing*, 48(1):172-183, 2000.

Grigoryan, "2-D and 1-D multipaired transforms: Frequency-time type wavelets," *IEEE Trans. Signal Processing*, 49(2):344-353, 2001.

Grigoryan, "New algorithms for calculating the discrete Fourier transforms," *Vichislit. Matem. i Mat. Fiziki, AS USSR (USSR Compt. Naths. Math. Pys.)*, 26(5): 84-88, 1986.

Heidemann, *Multiplicative Complexity, Convolution, and the DFT*, New York: Springer-Verlag, 1988.

(Continued)

*Primary Examiner*—David D. Kneppper
(74) *Attorney, Agent, or Firm*—Fulbright & Jaworski LLP

(57) ABSTRACT

Systems and methods are described for a fast paired method of 1-D cyclic convolution. A method includes calculating a paired transform of a signal, grouping components of the paired transform to form a plurality of splitting-signals, shifting the plurality of splitting signals, multiplying the plurality of splitting signals by a plurality of corresponding Fourier transforms, and calculating an inverse paired transform of the plurality of splitting signals.

12 Claims, 6 Drawing Sheets

OTHER PUBLICATIONS

Ifeacher and Jervis (eds.), *Digital Signal Processing*, 2nd edition, Prentice Hall, 2002.

Nussbaumer, *Fast Fourier Transform and Convolution Algorithms*, 2nd ed., Springer—Verlag, Berlin, 1982.

Oppenheim and Shafer, *Digital Signal Processing*, Prentice-Hall, Englewood Cliffs, NJ: Prentice-Hall, c1975.

Proakis and Manolakis, *Digital Signal Processing: Principles, Algorithms, and Applications*, 3rd ed., Englewood Cliffs, NJ: Prentice-Hall, 1996.

Reddy and Reddy, "Complex rectangular transforms for digital convolution," *IEEE Trans. Acoustic, Speech, Signal Proc.*, ASSP-28(5):592-596, 1980.

Stockham, "High-speed convolution and correlation with applications to digital filtering," In: *Digital Processing of Signals*, Gold et al., (eds.), McGraw-Hill, New York, pp. 203-232, 1969.

Stockham, "High-speed convolution and correlation," in: *Spring Joint Computer Conf., AFIPS Proc.*, 28: 229-233, 1966.

\* cited by examiner

FAST PAIRED METHOD OF A 1-D CYCLIC CONVOLUTION REALIZATION

BACKGROUND OF THE INVENTION

1. Field of the Invention

The invention relates generally to the field of digital signal processing. More particularly, the invention relates to digital filtering for digital signal processing.

2. Discussion of the Related Art

Digital signal processing is an important aspect of digital communications. It may be used in communication applications such as satellite communication systems, satellite ranging systems (GPS, WAAS, GLONAS), radar systems, radio-locators for the military, and speech processing (such as processing a speech waveforms, when the input signal is of infinite duration), and restoration of a signal from noisy input.

Three important tools in signal processing are FIR filters, optimal Wiener filters, and correlation functions. Linear convolution is another tool that is realized in many processors, including industrially available processors such as: Universal processors and mobile devices' processors from Texas Instruments (Dallas, Tex.) and ST Microelectronics (Dallas, Tex.).

FIR Filters

Finite-length impulse response (FIR) filters are widely used. FIR filters may be important elements of most digital systems for the previously mentioned applications.

An 1-D FIR filter may be described by the linear convolution type equation $$y(n) = \sum_{k=0}^{M-1} x(k-n)h(k), \quad n = 0:(N-1), \tag{1}$$

where $x(n)$ is an input signal of length L and $h(k)$ is the impulse response characteristics of the filter that has a length $M \geq L$. If $N \geq L+M-1$, the cyclic convolution and linear convolution are identical.

As is known, the efficient realization of FIR filters is not provided by calculation in the time domain, especially for long data signals. The frequency-domain approach based on the discrete Fourier transform is a computational procedure that serves as an alternative to time-domain convolution, and it is computationally more efficient than time-domain convolution due to the existence of efficient algorithms for computing the DFT. These algorithms are called fast Fourier transform (FFT) algorithms.

Optimal Wiener Filters

A Wiener filter is defined as a filter that provides optimal estimate of original discrete signal $x(n)$ from an observed noisy signal $$y(n) = \sum_{k=0}^{N-1} x(k-n)h(k) + n(n), \quad n = 0:(N-1), \tag{2}$$

where $n(n)$ is noise. The optimality is with respect to mean-square error and the estimate is defined as the linear cyclic convolution $$\hat{x}(n) = \sum_{k=0}^{N-1} w(k)y(k-n), \quad n = 0:(N-1), \tag{3}$$

where $w(k)$ is the impulse response function of the Wiener filter. The filtering in equation (3) is implemented in the Fourier domain, $\hat{X}(\omega)=W(\omega)Y(\omega)$, by the filter with transfer function $$W(\omega) = \frac{\overline{H}(\omega)}{|H(\omega)|^2 + \phi_{n/x}(\omega)}, \quad \omega = 0:(N-1), \tag{4}$$

where $H(\omega)$ is the DFT of $h(k)$ and $\phi_{n/x}(\omega)$, the noise-signal ratio. $\hat{X}(\omega)$ and $Y(\omega)$ are the Fourier transforms of $\hat{x}(n)$ and $y(n)$ respectively.

The realization of optimal filtering requires three DFTs and N multiplications to calculate $\hat{X}(\omega)$. Therefore, the total number of multiplications required to perform optimal filtration by the DFT method can be estimated as $$3[N/2(\log_2 N-3)+2]+N+3N=3N/2(\log_2 N-3)+4N+6.$$

where 3N operations are assumed for calculation of the optimal filter in equation (4).

Cross-Correlation

Cross-correlation between two discrete sequences or signals $x(n)$ and $h(n)$ is defined as $$r(n) = \frac{1}{N}\sum_{k=0}^{N-1} x(k)h(k+n) \tag{5}$$

The data sequences may be either correlated or convolved simply by reversing the order of one of the data sequences. Thus, the correlation and convolution can be calculated by the same program simply by reversing one of the sequences.

The correlation computation may be speeded by using the DFT approach because in the Fourier domain the correlation takes the following form $$R(\omega)=X(\omega)\hat{H}(\omega), \omega=0:(N-1). \tag{6}$$

The correlation realization by the FFT requires the same number of operations as for the linear convolution. For longer data sequences, the fast DFT method may be used to achieve fast correlation.

FFT Method of Convolution Realization

The DFT provides a discrete frequency representation of the finite-duration sequence (signal) in frequency domain and it reduces the cyclic convolution of two sequences to the simple operation of the multiplication of their Fourier transforms $$Y(p)=X(p)H(p) \tag{7}$$

where $Y(p)$, $X(p)$, and $H(p)$ are the discrete Fourier transforms of $y(n)$, $x(n)$, and $h(k)$, respectively.

The discrete Fourier transform, $X(p)$, of the signal $x(t)$, of length N, is multiplied by the frequency characteristics, $H(p)$, of a linear filter. And then the inverse discrete Fourier transform, $F^{-1}$, is used, which results in the filtered signal, Y(t). A diagram of the Fourier method is shown in blocks 100-105 depicted in FIG. 1A.

$$r(t) \to F[r](p) = X = (p) \to X(p)H(p) = Y(p) \to F^{-1}[Y(p)](t)$$
$$= y(t)$$

The DFT may be performed twice (the DFT performance is not considered for the H(p)). This approach uses N values of the frequency characteristics and requires N operations of complex multiplication in the frequency domain and N−1 additions. Additionally, direct and inverse DFTs require N/2 ($\log_2$ N−3)+2 complex multiplications. Therefore, the traditional FFT method of the linear filtration requires $$M_N = 2[N/2(\log_2 N - 3) + 2] + N = N(\log_2 N - 2) + 4. \quad (8)$$

complex multiplications, and about $$A_N = 2N(\log_2 N - 2) \quad (9)$$

operations of additions. Here, the case of most interest in practice is considered, when the length of the signal is $N=2^r$, r>1.

If one assumes that the complex multiplication is performed by three real multiplications and three additions, then the numbers of real operations of multiplications and additions can be estimated as $$3M_N = 3N(\log_2 N - 2) + 9, \quad 3A_N = 6N(\log_2 N - 2). \quad (10)$$

The FFT-based method of realization of the convolution is superior from a computational point of view.

Other Methods

Some disadvantages of applying the DFT are in the use of trigonometric functions cosine and sine functions, and other complex arithmetic functions. To avoid such disadvantages, different algebraic methods have been proposed. Among them are the overlap-saved and overlap-add methods and the nesting of polynomials. These algorithms represent 1-D convolution as multi-dimensional convolutions which are reduced to computation of small length convolutions and polynomial multiplications. These algorithms require fewer arithmetic operations than the FFT approach for small sequence length N<200. This is due to the fact that the number of multiplications per sample for these algorithms equals $(3/2)^r$ for $N=2^r$, and this number grows exponentially faster than the linear estimate (3r−2) for the DFT. Therefore, these algorithms do not provide the fast performance of the FIR filter for long data.

The requirements for a fast and simple convolution process for long signals have not been fully met. What is needed is a solution that addresses both of these requirements.

SUMMARY OF THE INVENTION

There is a need for the following embodiments. Of course, the invention is not limited to these embodiments.

According to an aspect of the invention, a method for cyclic convolution comprises calculating a paired transform of a signal, grouping components of the paired transform to form a plurality of splitting-signals, shifting the plurality of splitting signals, multiplying the plurality of splitting signals by a plurality of corresponding Fourier transforms, and calculating an inverse paired transform of the plurality of splitting signals.

BRIEF DESCRIPTION OF THE DRAWINGS

The drawings accompanying and forming part of this specification are included to depict certain aspects of the invention. The invention may be better understood by reference to one or more of these drawings in combination with the description presented herein. It should be noted that the features illustrated in the drawings are not necessarily drawn to scale.

DETAILED DESCRIPTION

Linear convolution is the core of digital signal and image processing. A new fast method for implementing one-dimensional cyclic (circular) convolution is presented. The method is based on the paired representation of a 1-D signal with respect to the Fourier transform. A signal is transformed uniquely into a set of short signals, by means of which the 1-D DFT of the signal is split into a set of short 1-D DFTs.

The paired transformation allows one to perform a linear filtration of a signal by means of an incomplete number of the frequency characteristics of the filter at specific points. As a result, the complexity of the implementation decreases. For example, the linear filtration of the signal of length $N=2^r$, r>1, can be performed by using only $\log_2$ N+1 values of frequency characteristics of the filters and N real multiplications, instead of N $\log_2$ N complex multiplications in the traditional method.

Linear convolution of two sequences x(n) and h(n) of length N is defined by equation $$y(n) = \sum_{k=0}^{N-1} x(k-n)h(k), \quad n = 0 : (N-1), \quad (11)$$

where indices are taken modulo N. The direct calculation of the convolution requires $N^2$ multiplications.

Fast Method of Paired Transforms

This disclosure demonstrates an approach that is based on the paired representation of signals, which is a signal transformation to a set of short signals. This transformation, which is called the paired transformation, allows for the performance of linear convolution (filtration) of the signal by performing convolutions (filtration) of short signals with fewer operations than is required by the method based on DFT.

The proposed fast paired method of the convolution may be applied at least for:

1. Fast realization of noncyclic linear convolutions, or FIR filters;
2. Fast realization of the optimal Wiener filtration of signals; and 3. Fast realization of the cyclic correlation.

Instead of filtering signals in the frequency domain, linear convolution (filtration) is implemented by processing the short signals. Such method requires only N operations of real multiplication and uses only a few of the frequency characteristics of a linear filter at specific points. As a result, the paired method of linear convolution realization uses $\log_2 N$ operations less than the FFT method. For instance, the linear convolution of the signal of length 1024 by the paired transforms uses 10 times fewer operations than the FFT method requires.

Figure 1A:
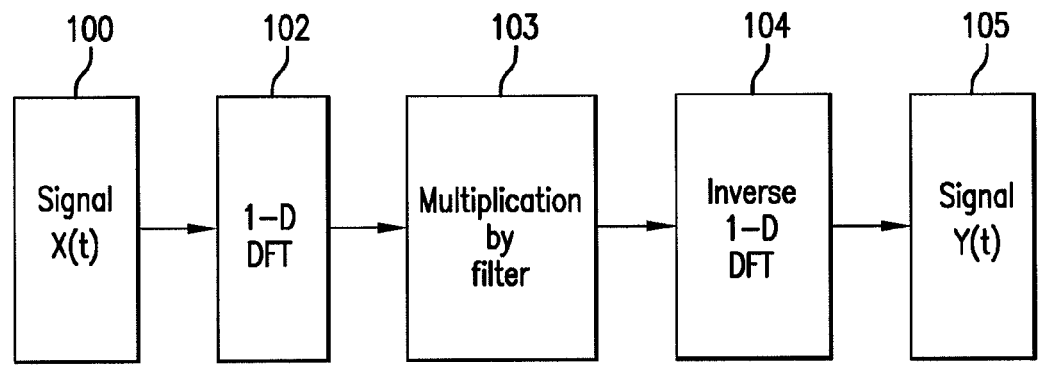
FIG. 1A is a flow diagram showing the traditional method of signal filtration by a Discrete Fourier Transform (DFT).
Figure 1B:
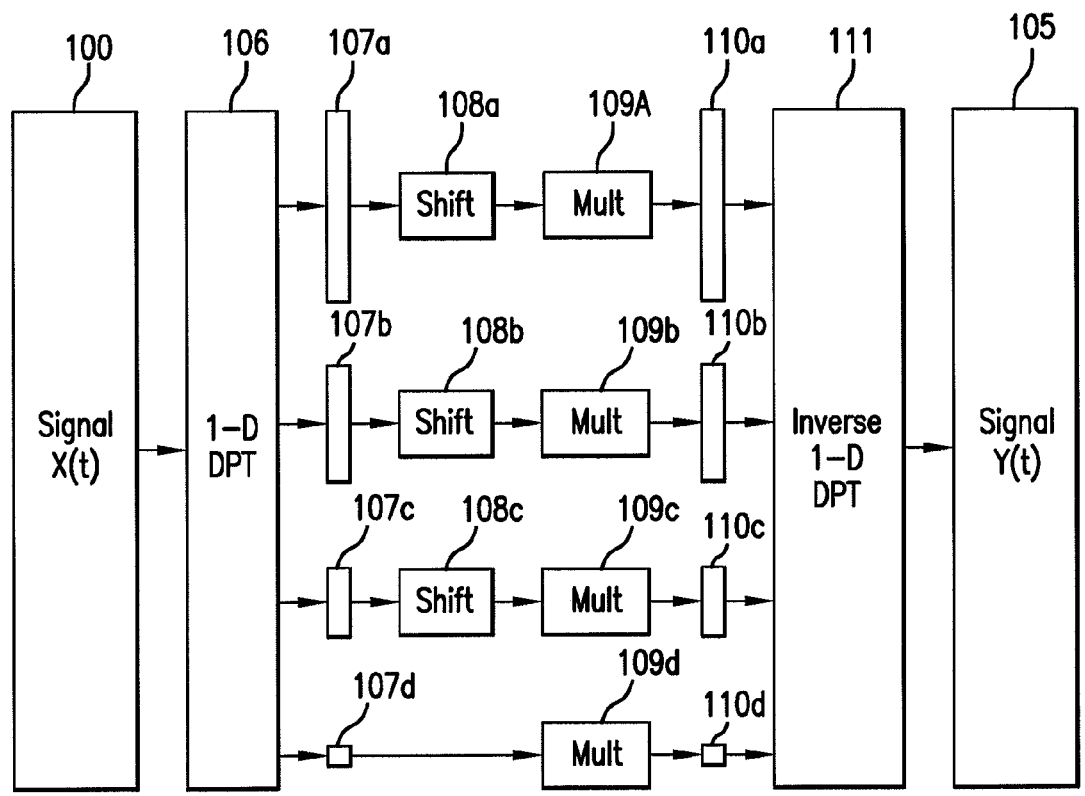
FIG. 1B is a flow diagram showing a paired-method of signal filtration by the discrete paired transform (DPT), in accordance with an embodiment of the present disclosure.
Figure 2:
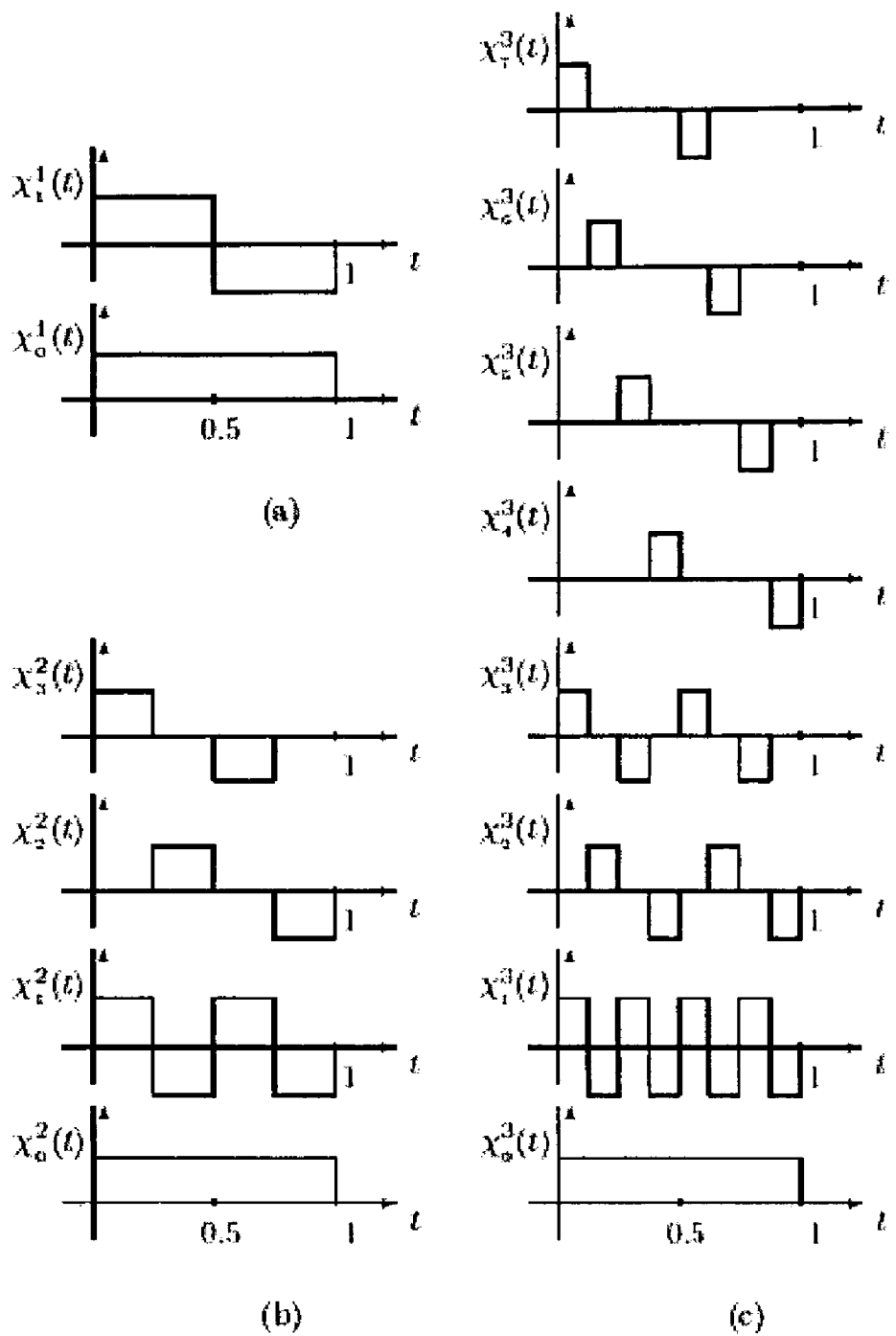
FIG. 2 illustrates the basis functions of the 2, 4, and 8-point paired transforms, an aspect of the present disclosure.

A diagram of the realization of the linear convolution by the paired transforms, an embodiment of the present invention, is given in FIG. 1B. As shown in blocks 100-111 of FIG. 1B, multiplication steps are taken only at a few selected points of the filter Y(p), instead of multiplying the signal by all values of the filter, as shown in FIG. 1A. To describe the proposed method, the definition and main properties of the unitary paired transforms that are used in the method are given.

Unitary Paired Transform

The one-dimensional unitary discrete paired transforms (DFT's) is described in the following way. Consider the case of most interest, when the length of signals is $N=2^r$, $r>1$. Let $p,t \in X_N=\{0,1,\ldots,N-1\}$, and let $\chi_{p,t}$ be the binary function $$x_{p,t}(n) = \begin{cases} 1, & \text{if } np = t \bmod N, \\ 0, & \text{otherwise,} \end{cases} \quad n = 0:(N-1). \tag{12}$$

Definition: Given a sample $p \in X_N$ and integer $t \in [0, N/2]$, the function $$\chi'_{p,t}(n) = X_{p,t}(n) - X_{p,t+N/2}(n) \tag{13}$$

is called the 2-paired, or shortly, the paired function.

The totality of the paired function $$\{\chi'_{2n,2nt};n=0:(r-1),t=0:(2^{r-n-1}-1),1\} \tag{14}$$

is the complete and orthogonal set of functions. The unitary transform $\chi'$ composed by this complete set of functions is called the paired transform. For example, the matrix of the 8-point paired transform $\chi'_8$ takes the form $$X_8^1 = \begin{bmatrix} [x'_{1,0}] \\ [x'_{1,1}] \\ [x'_{1,2}] \\ [x'_{1,3}] \\ [x'_{2,4}] \\ [x'_{2,2}] \\ [x'_{4,0}] \\ [x'_{n,0}] \end{bmatrix} = \begin{bmatrix} 1 & 0 & 0 & 0 & -1 & 0 & 0 & 0 \\ 0 & 1 & 0 & 0 & 0 & -1 & 0 & 0 \\ 0 & 0 & 1 & 0 & 0 & 0 & -1 & 0 \\ 0 & 0 & 0 & 1 & 0 & 0 & 0 & -1 \\ 1 & 0 & -1 & 0 & 1 & 0 & -1 & 0 \\ 0 & 1 & 0 & -1 & 0 & 1 & 0 & -1 \\ 1 & -1 & 1 & -1 & 1 & -1 & 1 & -1 \\ 1 & 1 & 1 & 1 & 1 & 1 & 1 & 1 \end{bmatrix}$$

Splitting of the DFT

Here, the one-dimensional N-point Fourier transform of a discrete signal $f=\{f_n\}_{n=0:(N-1)}$ is considered:

$$F_p = (\mathcal{F}_N \circ f)_p = \sum_{n=0}^{N-1} f_n W^{np}, \quad p = 0:(N-1), \tag{15}$$

where $W=W_N=\exp(-j2\pi/N)$.

By means of $N/2^k$-point paired transforms $\chi'_{N/2^k}$, $k=0:(r-1)$, the matrix of the Fourier transform is decomposed into the products of the weakly filled binary matrices. The paired transform is fast and requires $3N-2$ additions. The decomposition of the N-point DFT by the paired transforms requires $2^{r-1}(r-3)+2$ multiplications.

For each point $p \in X_N$, the following equality holds $$F_{(2m+1)p} = \sum_{t=0}^{N/2-1} (f'_{p,t} W^t) W_{N/2}^{mt}, \quad m = 0:(N/2-1). \tag{16}$$

The sequence $\{f'_{p,0}, f'_{p,1}, \ldots, f'_{p,N/2-1}\}$ determines completely the N-point DFT of the signal $f$ at points of the set $T'_p$ of $X_N$, $$T'_p = \{\overline{(2m+1)p}; m=0:(N/2-1)\}$$

where $\bar{l}=l \bmod N$, for an integer l:

Such a sequence may be considered a splitting-signal of the signal f, that corresponds to the set $T'_p$. Consider the following partition $\sigma'$ of $X_N$ composed of the sets $T'_p$ $$\sigma' = \sigma'_N = ((T'_{2^n}; n=0:r-1), \{0\}) \tag{17}$$

The splitting-signal that corresponds to the first set $T'_1$ of the partition or $\sigma'$ $$f_{T'_1} = \{f_{1,0}, f_{1,1}, \ldots, f_{1,N/2-1}\}$$

has length $N/2$. For the next splitting-signal $f_{T'_2}$, all components $f_{2,t}=0$ with odd t, and equation (16) represents the N/4-point DFT (note, that the set $T'_2$ contains also N/2 points). Therefore, noninformative components $f_{2,2k+1}$ can be discarded, and $f_{T'_2}$ can be considered as a signal of length N/4, that is $f_{T'_2} = \{f_{2,0}, f_{2,2}, \ldots, f_{2,N/2-2}\}$. Similarly, since $f_{2^m,t}=0$ if g.c.d. (greatest common divisor) $(p,t) \neq 2^m$, consider $f_{T'_{2^m}}$ as the signal of length $N/2^{m+1}$, and the N/2-point DFT in equation (15) becomes the $2^{r-m-1}$-point DFT.

Denoted by $\Gamma'$ (f), the totality of splitting-signals $$\Gamma'(f) = \{f'_{T'_1}, f'_{T'_2}, f'_{T'_4}, \ldots, f'_{T'_{2^{r-1}}}, f'_{T_0}\}$$

describes uniquely the signal f in the paired representation. This set of splitting signals is the image of the paired transformation over the signal f.

Figure 3:
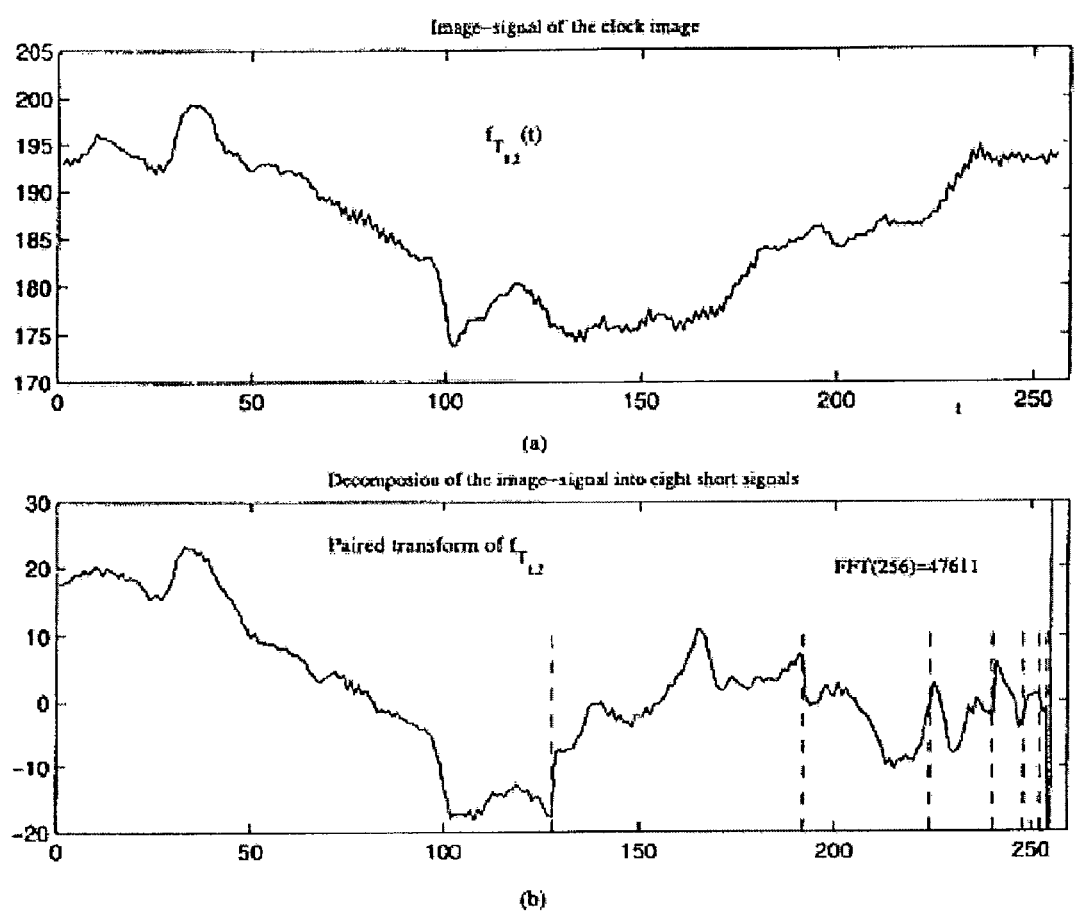
FIG. 3 illustrates the splitting of a 256-point signal by a paired transform, in accordance with an embodiment of the present disclosure.

As an example, FIG. 3 shows (a) a signal of length 256 and (b) its paired transform. Eight splitting signals are separated by the vertical lines and can be seen in part (b). In Example 1, the calculation and splitting of a paired transform of a signal is shown.

1-D Linear Convolution Realization

Consider the cyclic convolution of two sequences $f_k$ and $y_K$ in the framework of the linear filtration. Let Y be a 1-D linear filter with the impulse characteristics $y_m$, and let f be the filtered signal which is described by the discrete linear cyclic convolution $$\hat{f}_n = \sum_{k=0}^{N-1} y_{n-k} f_k, \quad n = 0:(N-1), \tag{18}$$

where the indices modulo N are taken. The linear filtration in the frequency domain is described by $$\hat{F}_p = Y_p F_p, \quad p=0:(N-1), \tag{19}$$

where the frequency characteristics $Y_p$, and $\hat{F}_p$ and $F_p$ are the discrete Fourier transforms of $y_n$, and the signals $\hat{f}_n$ and $f_n$, respectively.

In terms of the paired representation, the spectral components $\hat{F}_p$ and $F_p$ are described by the corresponding splitting-signals of length N/2

$$\hat{f}_{T'_p} = \{\hat{f}_{p,0}, \hat{f}_{p,1}, \ldots, \hat{f}_{p,N/2-1}\}$$

$$f_{T'_p} = \{f_{p,0}, f_{p,1}, \ldots, f_{p,N/2-1}\} \quad (20) \text{ and } (21)$$

and their values are defined by the paired functions as $$f'_{p,t} = \chi'_{p,t} \circ f, \; \hat{f}'_{p,t} = \chi'_{p,t} \circ \hat{f}, \; t=0{:}(N/2-1) \quad (22)$$

Owing to the construction of the partition $\sigma'$ in (17), the paired transformation $\chi'_N$ is induced by the functions $\chi'_{p,t}$ for $p=2^n$ ($n=0{:}(r-1)$) and $p=0$. Therefore, it is sufficient to analyze the equality (18) only at these r+1 points. The response function $Y_p$ of the linear filter in the polar form ($|Y_p|$, $\phi_p$) is considered, where $|Y_p|$ is the absolute value and $\phi_p \in [-\pi, \pi]$ is the phase of $Y_p$. The phase $\phi_p$ by the angle composed by the line drawn from the original and intersected the unit circle at the nearest point of the partition of the circle divided to N equal parts is approximated. Take the value of $\phi_p = \phi_p/(2\pi/N)$ and denote by $\overline{\phi}_p = [\phi_p]$ the integer part of the number $\phi_p$. The value of, $\overline{\phi}_p$ is a value within the interval $[-N/2, N/2]$.

$\phi_p$ is assumed to be an integer. This means that the values $\phi_p$ of the filter phases are considered to be quantized in the interval $[-N/2, N/2]$. Consequently, one can represent the response function of the filter in the following form $$Y_p = |Y_p| W^{\overline{\phi}_p}, \; p=2^n, \; n=0{:}(r-1) \quad (23)$$

Figure 4:
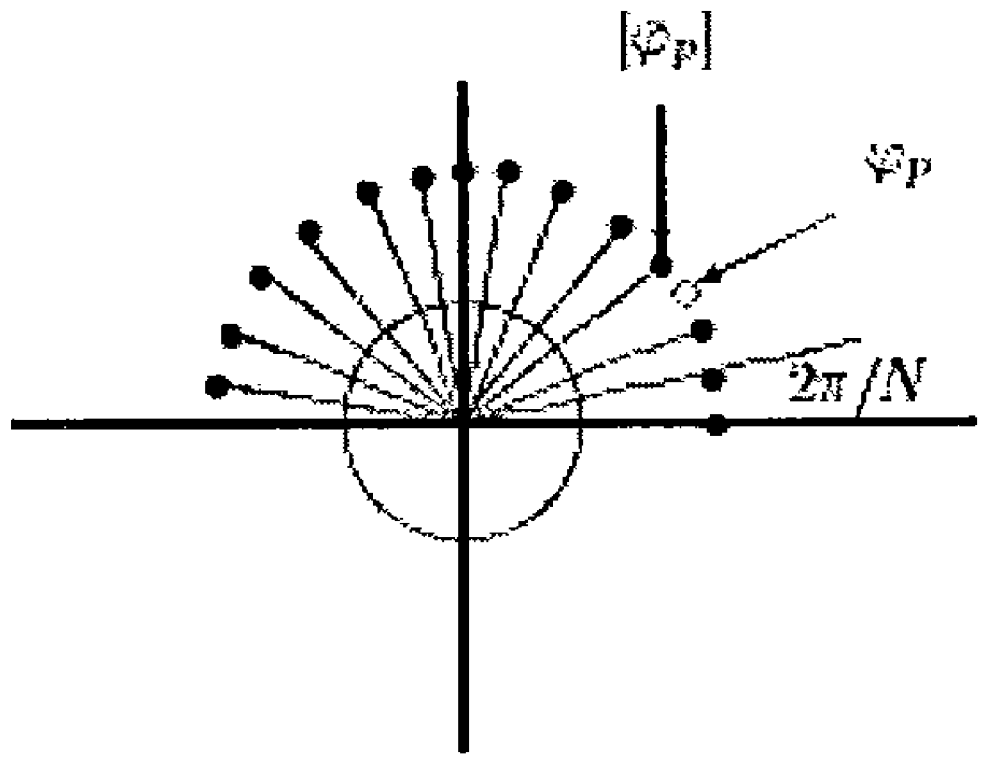
FIG. 4 illustrates angles $|\phi_p|$ and $\phi_p$ on a circle.

Apparently, for large values N (for instance, such as $N \geq 1024$), it can be assumed that the normed phase $\overline{\phi}_p = [\phi_p/(2\pi/N)] \approx \phi_p/(2\pi/N)$. That is why, for large N, $\overline{\phi}_p = \phi_p/(2\pi/N)$ (See FIG. 4) may be used. Furthermore for practical applications, when the filter frequency characteristics $Y_p$ is computed via the N-point DFT, the phases of $Y_p$ are exact multiples of $2\pi/N$. The number $2\pi/N$ is the common period of all basis exponential functions $W^{np}$ of the DFT (15). Therefore, the equality in (23) holds for all frequencies p under consideration.

If $\overline{\phi}_p < 0$, the right part of (19) can be written as $$Y_p F_p = \sum_{t=0}^{N/2-1} (|Y_p| f'_{p,t}) W^{t+\overline{\phi}_p} = \sum_{t=0}^{N/2-1} (|Y_p| f'_{p,t-\overline{\phi}_p}) W^t \quad (24)$$

where $f'_{p,-t} = -f'_{p,N/2-t}$ for $t=0{:}(N/2-1)$.

If $\overline{\phi}_p > 0$, the right part of (19) can be written as $$Y_p F_p = \sum_{t=0}^{N/2-1} (|Y_p| f'_{p,t}) W^{t-\overline{\phi}_p} = \sum_{t=0}^{N/2-1} (|Y_p| f'_{p,t+\overline{\phi}_p}) W^t \quad (25)$$

where $f'_{p,N/2+t} = -f'_{p,t}$ for $t=0{:}(N/2-1)$.

Comparing (24) and (25) with (19), $$\hat{F}_p = \sum_{t=0}^{N/2-1} \hat{f}'_{p,t} W^t = \sum_{t=0}^{N/2-1} (|Y_p| f'_{p,t \mp \overline{\phi}_p}) W^t$$

One can see that the components of the splitting-signal $\hat{f}_{T'_p}$ for the filtered image are defined as $$\hat{f}'_{p,t} = \begin{cases} |Y_p| f'_{p,t+sgn(\overline{\phi}_p)\overline{\phi}_p}, & \text{if } 0 \leq t+sgn(\overline{\phi}_p)\overline{\phi}_p < N/2 \\ -|Y_p| f'_{p,(t+sgn(\overline{\phi}_p)\overline{\phi}_p) \bmod N/2}, & \text{otherwise} \end{cases} \quad (26)$$

where $t=0{:}(N/2-1)$, and sgn(x) is the function defined as sgn(x)=−1 of x<0, and sgn(x)=1 if $x \geq 0$.

To calculate the splitting-signal (21) of the filtered signal, one can multiply the splitting-signal (20) by the scalar $|Y_p|$ and shift cyclically each of its components $f'_{p,t}$ by $\overline{\phi}_p$ elements. The shifting is to the right, if $\overline{\phi}_p < 0$, or to the left, if $\overline{\phi}_p > 0$.

Let $\hat{F}_p$ and $F_p$ be respectively the splitting-signals $\hat{f}_{T'_p}$ and $f_{T'_p}$ written in the vector forms. Then, in the paired representation, one can write equation (19) in the following matrix form $$\hat{F}_p = |Y_p| T^{\overline{\phi}_p} F_p \quad (27)$$

where T is the operator of the cyclic shift of the vector of dimension N/2 by one element to the right (if $\overline{\phi}_p < 0$)

$$TF_p = (-f_{p,N/2-1}, f_{p,0}, f_{p,1}, \ldots, f_{p,N/2-2})', \quad (28)$$

and $T^{\overline{\phi}_p}$ is its $\overline{\phi}_p$-th power.

The matrix of the operator $T^{\overline{\phi}_p}$ has the form $$|T^{\overline{\phi}_p}| = \begin{vmatrix} 0 & . & . & 0 & -1 & 0 & . & . & . & 0 \\ 0 & 0 & . & . & 0 & -1 & 0 & . & . & 0 \\ 0 & 0 & 0 & . & . & 0 & -1 & 0 & . & 0 \\ . & . & . & . & . & . & . & . & . & . \\ . & . & . & . & . & . & . & . & 0 & -1 \\ 1 & 0 & . & . & . & . & . & . & . & . \\ 0 & 1 & 0 & . & . & . & . & . & . & . \\ . & . & . & . & . & . & . & . & . & . \\ 0 & . & . & 1 & 0 & . & . & . & . & . \end{vmatrix} \Bigg\} \overline{\phi}_p$$

if $\overline{\phi}_p < 0$, and $[T^{\overline{\phi}_p}]$ is described by the matrix transposed to $[T^{-\overline{\phi}_p}]$ if $\overline{\phi}_p > 0$. Note, that $[T^{\overline{\phi}_p}] = -[T^{N/2-\overline{\phi}_p}]$.

For the considered points $p=2^n$, ($n=0{:}(r-1)$), and $p=0$, the components $f_{p,t}$ and $\hat{f}_{p,t} \equiv 0$ in vectors (20) and (21), if g.c.d.(p,t)$\neq$p. Therefore, the values $\overline{\phi}_p$ in (27) can be considered to be equal to $\overline{\phi}_p/p$, and the size of the matrix $[T^{\overline{\phi}_p}]$ to be equal to N/(2p)×N/(2p).

To obtain the estimation $\hat{f}$ of the initial signal, the inverse discrete paired transform must be fulfilled. The diagram of realization the linear convolution by the paired transforms is given in FIG. 1b.

Linear Convolution in Matrix Form

The simple matrix representation for the convoluted sequence $f_n$ with $y_n$ is given here. $\otimes$ denotes the operation of the direct product of matrices, and by $\hat{f}$ and f the vectors composed of signals $\hat{f}_n$ and $f_n$, respectively.

Let $Y_p$, p=0: (N−1), be the Fourier transform (or, the frequency characteristic of the linear filter). Assume that for the phase of $Y_p$, the following holds $\bar{\phi}_p = \phi_p = (2\pi/N)$, for p=0, 1, 2, 4, 8, ..., N/2. Then, $\hat{f}_n$ in can be written in the following matrix form $$\hat{f} = |(\chi'_N)^{-1}| \left( \bigotimes_{n=0}^{r} (|Y_{2^n}| \otimes |I_{2^{r-n-1}}|)[T^{\bar{\phi}_{2^n}}] \right) |\chi'_N| f. \quad (29)$$

$I_M$ is the unit matrix M×M.

For simplification purposes, consider $|Y_{2^r}|$ to be equal to $|Y_0|$, $\bar{\phi}_{2^r} = \bar{\phi}_0 = 0$, and $I_{-1} = 1$:

Estimation of Arithmetical Operations

Let $N=2^r$, r>>1, then for the realization of the linear convolution of the real sequence $f_n$ with $y_n$ by means of the paired transform it is sufficiently to fulfill $$M'_N = N, \text{ and } C'_N = 4N-4 \quad (30)$$

real operations of multiplications and additions, respectively. In fact, from the matrix representation (29) it follows that for the described filtering it is necessary to fulfill N real multiplications by r+1 modules of the frequency characteristics $Y_p$. The number of additions required for the direct or the inverse paired transformation equals 2N−2.

For a complex signal f, the number of real operations of multiplications equals 2N, since two real multiplications are needed to multiply a complex number by a real one (modulus). The number of additions in this case equals 2(4N−4). The number of the arithmetical operations is exceeded in real case by two times.

Thus, the described method requires O(N) arithmetical operations. It should be noted for the comparison, that the traditional method of the DFT uses O(rN) arithmetical operations of multiplications and additions. Indeed, if considering that the number of the complex multiplications for the N-point DFT equals $2^{r-1}(r-3)+2$, then the number of complex multiplications required for filtering the signal via the DFT method equals $$2|2^{r-1}(r-3)+2|+2^r = 2^r(r-2)+4.$$

In a case where one complex multiplication is executed via three real multiplications and three real additions, then the numbers of real multiplications and additions required to calculate the convolution by the FFT method can be estimated as follows:

$$M_N^1 = 3|2^r(r-2)+4| = 3\times 2^r(r-2)+12$$

$$A_N^1 = 3|2(2^{r-1}(r-3)+2)+r2^r+2^r|+4|2^r-2|=3\times 2^r(r+3)+4. \quad (31)$$

Taking into account the property of complex conjugation of spectral components for the real data, $\hat{F}^*_p = \hat{F}^*_{N-p}$ for p=1: (N/2−1), the following estimates are obtained $$M_N^1 = 3/2N(r-2)+6, \ A_N^1 = 3/2N(r+3)+2. \quad (32)$$

The proposed method uses N multiplications, i.e. it requires $\mu_N$ times less multiplications than the fast DFT method uses, where $$\mu_N = \frac{3/2N(r-2)}{N} = 3/2(r-2).$$

For example, $\mu_{256}=9$, $\mu_{1024}=12$, and $\mu_{4096}=15$. If compare the operations of additions, then the advantage of the proposed algorithm is estimated by coefficient $$\alpha_N = \frac{3N/2(r+3)+4}{4N-4} \geq 3/8(r+3).$$

For example, $\alpha_{256} \approx 4$, $\alpha_{1024} \approx 5$, and $\alpha_{4096} \approx 5.6$.

Only (r+1) values of the Fourier transform $Y_p$ (or, frequency characteristics of the filter) are used in the proposed method. Additional operations reduction can be achieved by using a non complete DFT algorithm for computing required $Y_p$.

Calculation of Inverse Paired Transform

Unitary Inverse Paired Transform

Consider the transform that is inverse to the unitary paired transform $\chi'_N$. The N-point discrete inverse unitary transform $(\chi')_N^{-1}$ is defined by the matrix $Y_N^1$ being inverse to the matrix $X_N^1$ of the N-point discrete inverse unitary transform, i.e.

$$Y_N^1 X_N^1 = I_N$$

where $I_N$ is the unit matrix N×N.

The matrix of the inverse paired transform can be easily found if we consider the paired transform with normalized basis functions. In this case, the inverse paired transform is defined by the matrix $Y_N^1$. that is transposed to the matrix $X_N^1$.

Inverse 8-Point DPT

Consider the matrix of the 8-point paired transform $\chi'_8$ $$X_8^1 = \begin{bmatrix} 1 & 0 & 0 & 0 & -1 & 0 & 0 & 0 \\ 0 & 1 & 0 & 0 & 0 & -1 & 0 & 0 \\ 0 & 0 & 1 & 0 & 0 & 0 & -1 & 0 \\ 0 & 0 & 0 & 1 & 0 & 0 & 0 & -1 \\ 1 & 0 & -1 & 0 & 1 & 0 & -1 & 0 \\ 0 & 1 & 0 & -1 & 0 & 1 & 0 & -1 \\ 1 & -1 & 1 & -1 & 1 & -1 & 1 & -1 \\ 1 & 1 & 1 & 1 & 1 & 1 & 1 & 1 \end{bmatrix}$$

The paired transform of the signal f={0, 1, 2, 3, 4, 5, 6, 7} is the signal g={−4, −4, −4, −4, −4, −4, −4, 28}.

Indeed $$\begin{bmatrix} 1 & 0 & 0 & 0 & -1 & 0 & 0 & 0 \\ 0 & 1 & 0 & 0 & 0 & -1 & 0 & 0 \\ 0 & 0 & 1 & 0 & 0 & 0 & -1 & 0 \\ 0 & 0 & 0 & 1 & 0 & 0 & 0 & -1 \\ 1 & 0 & -1 & 0 & 1 & 0 & -1 & 0 \\ 0 & 1 & 0 & -1 & 0 & 1 & 0 & -1 \\ 1 & -1 & 1 & -1 & 1 & -1 & 1 & -1 \\ 1 & 1 & 1 & 1 & 1 & 1 & 1 & 1 \end{bmatrix} \begin{bmatrix} 0 \\ 1 \\ 2 \\ 3 \\ 4 \\ 5 \\ 6 \\ 7 \end{bmatrix} = \begin{bmatrix} -4 \\ -4 \\ -4 \\ -4 \\ -4 \\ -4 \\ -4 \\ 28 \end{bmatrix}$$

The inverse 8-point paired transform has the matrix $$Y_8^1 = \frac{1}{8}\begin{bmatrix} 1 & 0 & 0 & 0 & -1 & 0 & 0 & 0 \\ 0 & 1 & 0 & 0 & 0 & -1 & 0 & 0 \\ 0 & 0 & 1 & 0 & 0 & 0 & -1 & 0 \\ 0 & 0 & 0 & 1 & 0 & 0 & 0 & -1 \\ 1 & 0 & -1 & 0 & 1 & 0 & -1 & 0 \\ 0 & 1 & 0 & -1 & 0 & 1 & 0 & -1 \\ 1 & -1 & 1 & -1 & 1 & -1 & 1 & -1 \\ 1 & 1 & 1 & 1 & 1 & 1 & 1 & 1 \end{bmatrix}$$

The inverse transform of the obtained g={−4, −4, −4, −4, −4, −4, −4, 28} results in the initial singal f={0, 1, 2, 3, 4, 5, 6, 7}. Indeed, $$\frac{1}{8}\begin{bmatrix} 1 & 0 & 0 & 0 & -1 & 0 & 0 & 0 \\ 0 & 1 & 0 & 0 & 0 & -1 & 0 & 0 \\ 0 & 0 & 1 & 0 & 0 & 0 & -1 & 0 \\ 0 & 0 & 0 & 1 & 0 & 0 & 0 & -1 \\ 1 & 0 & -1 & 0 & 1 & 0 & -1 & 0 \\ 0 & 1 & 0 & -1 & 0 & 1 & 0 & -1 \\ 1 & -1 & 1 & -1 & 1 & -1 & 1 & -1 \\ 1 & 1 & 1 & 1 & 1 & 1 & 1 & 1 \end{bmatrix}\begin{bmatrix} -4 \\ -4 \\ -4 \\ -4 \\ -4 \\ -4 \\ -4 \\ 28 \end{bmatrix} = \begin{bmatrix} 0 \\ 1 \\ 2 \\ 3 \\ 4 \\ 5 \\ 6 \\ 7 \end{bmatrix}$$

Inverse 16-Point DPT

Consider the matrix of the 16-point paired transform $\chi'_{16}$ $$X_{16}^1 = \begin{bmatrix} 1 & 0 & 0 & 0 & 0 & 0 & 0 & 0 & -1 & 0 & 0 & 0 & 0 & 0 & 0 & 0 \\ 0 & 1 & 0 & 0 & 0 & 0 & 0 & 0 & 0 & -1 & 0 & 0 & 0 & 0 & 0 & 0 \\ 0 & 0 & 1 & 0 & 0 & 0 & 0 & 0 & 0 & 0 & -1 & 0 & 0 & 0 & 0 & 0 \\ 0 & 0 & 0 & 1 & 0 & 0 & 0 & 0 & 0 & 0 & 0 & -1 & 0 & 0 & 0 & 0 \\ 0 & 0 & 0 & 0 & 1 & 0 & 0 & 0 & 0 & 0 & 0 & 0 & -1 & 0 & 0 & 0 \\ 0 & 0 & 0 & 0 & 0 & 1 & 0 & 0 & 0 & 0 & 0 & 0 & 0 & -1 & 0 & 0 \\ 0 & 0 & 0 & 0 & 0 & 0 & 1 & 0 & 0 & 0 & 0 & 0 & 0 & 0 & -1 & 0 \\ 0 & 0 & 0 & 0 & 0 & 0 & 0 & 1 & 0 & 0 & 0 & 0 & 0 & 0 & 0 & -1 \\ 1 & 0 & 0 & 0 & -1 & 0 & 0 & 0 & 1 & 0 & 0 & 0 & -1 & 0 & 0 & 0 \\ 0 & 1 & 0 & 0 & 0 & -1 & 0 & 0 & 0 & 1 & 0 & 0 & 0 & -1 & 0 & 0 \\ 0 & 0 & 1 & 0 & 0 & 0 & -1 & 0 & 0 & 0 & 1 & 0 & 0 & 0 & -1 & 0 \\ 0 & 0 & 0 & 1 & 0 & 0 & 0 & -1 & 0 & 0 & 0 & 1 & 0 & 0 & 0 & -1 \\ 1 & 0 & -1 & 0 & 1 & 0 & -1 & 0 & 1 & 0 & -1 & 0 & 1 & 0 & -1 & 0 \\ 0 & 1 & 0 & -1 & 0 & 1 & 0 & -1 & 0 & 1 & 0 & -1 & 0 & 1 & 0 & -1 \\ 1 & -1 & 1 & -1 & 1 & -1 & 1 & -1 & 1 & -1 & -1 & -1 & -1 & -1 & -1 & -1 \\ 1 & 1 & 1 & 1 & 1 & 1 & 1 & 1 & 1 & -1 & 1 & -1 & 1 & -1 & 1 & -1 \end{bmatrix}$$

The 16-point paired transform of the signal f={2, 3, 2, 5, 2, 3, 5, 7, 1, 2, 4, 8, 7, 4, 2, 1} results in the output g=$X_{16}^1$; f'={1, 1, −2, −3, −5, −1, 3, 6, −6, −2, −1, 5, −1, −9, −8, 58}'.

The inverse 16-point paired transform has the matrix $$X_{16}^1 = \frac{1}{16}\begin{bmatrix} 8 & 0 & 0 & 0 & 0 & 0 & 0 & 0 & -8 & 0 & 0 & 0 & 0 & 0 & 0 & 0 \\ 0 & 8 & 0 & 0 & 0 & 0 & 0 & 0 & 0 & -8 & 0 & 0 & 0 & 0 & 0 & 0 \\ 0 & 0 & 8 & 0 & 0 & 0 & 0 & 0 & 0 & 0 & -8 & 0 & 0 & 0 & 0 & 0 \\ 0 & 0 & 0 & 8 & 0 & 0 & 0 & 0 & 0 & 0 & 0 & -8 & 0 & 0 & 0 & 0 \\ 0 & 0 & 0 & 0 & 8 & 0 & 0 & 0 & 0 & 0 & 0 & 0 & -8 & 0 & 0 & 0 \\ 0 & 0 & 0 & 0 & 0 & 8 & 0 & 0 & 0 & 0 & 0 & 0 & 0 & -8 & 0 & 0 \\ 0 & 0 & 0 & 0 & 0 & 0 & 8 & 0 & 0 & 0 & 0 & 0 & 0 & 0 & -8 & 0 \\ 0 & 0 & 0 & 0 & 0 & 0 & 0 & 8 & 0 & 0 & 0 & 0 & 0 & 0 & 0 & -8 \\ 4 & 0 & 0 & 0 & -4 & 0 & 0 & 0 & 4 & 0 & 0 & 0 & -4 & 0 & 0 & 0 \\ 0 & 4 & 0 & 0 & 0 & -4 & 0 & 0 & 0 & 4 & 0 & 0 & 0 & -4 & 0 & 0 \\ 0 & 0 & 4 & 0 & 0 & 0 & -4 & 0 & 0 & 0 & 4 & 0 & 0 & 0 & -4 & 0 \\ 0 & 0 & 0 & 4 & 0 & 0 & 0 & -4 & 0 & 0 & 0 & 4 & 0 & 0 & 0 & -4 \\ 2 & 0 & -2 & 0 & 2 & 0 & -2 & 0 & 2 & 0 & -2 & 0 & 2 & 0 & -2 & 0 \\ 0 & 2 & 0 & -2 & 0 & 2 & 0 & -2 & 0 & 2 & 0 & -2 & 0 & 2 & 0 & -2 \\ 1 & -1 & 1 & -1 & 1 & -1 & 1 & -1 & 1 & -1 & -1 & -1 & -1 & -1 & -1 & -1 \\ 1 & 1 & 1 & 1 & 1 & 1 & 1 & 1 & 1 & -1 & 1 & -1 & 1 & -1 & 1 & -1 \end{bmatrix}$$

One can check that the inverse transform of the signal g={1, 1, −2, −3, −5, −1, 3, 6, −6, −2, −1, 5, −1, −9, −8, 58} the initial signal f={2, 3, 2, 5, 2, 3, 5, 7, 1, 2, 4, 8, 7, 4, 2, 1}, i.e.

$$X_{16}^{\prime-1}g'=f.$$

The methods described previously may be implemented as a program that is run on a computer, or by a chip or microcontroller. These methods may also be run on other programs such as MatLab (commercially available from The MathWorks, Inc., Natick, Mass.). Examples 4 and 5 show examples of MatLab programs which would implement these methods.

The terms a or an, as used herein, are defined as one or more than one. The term plurality, as used herein, is defined as two or more than two. The term means, as used herein, is defined as hardware, firmware and/or software for achieving a result. The term program or phrase computer program, as used herein, is defined as a sequence of instructions designed for execution on a computer system. A program, or computer program, may include a subroutine, a function, a procedure, an object method, an object implementation, an executable application, an applet, a servelet, a source code, an object code, a shared library/dynamic load library and/or other sequence of instructions designed for execution on a computer system. The phrase any integer derivable therein, as used herein, is defined as an integer between the corresponding numbers recited in the specification.

EXAMPLES

Specific embodiments of the invention will now be further described by the following, nonlimiting examples which will serve to illustrate in some detail various features. The following examples are included to facilitate an understanding of ways in which the invention may be practiced. It should be appreciated that the examples which follow represent embodiments discovered to function well in the practice of the invention, and thus can be considered to constitute preferred modes for the practice of the invention. However, it should be appreciated that many changes can be made in the exemplary embodiments which are disclosed while still obtaining like or similar result without departing from the spirit and scope of the invention. Accordingly, the examples should not be construed as limiting the scope of the invention.

Example 1

Let N=16, and let the signal be f={2, 3, 2, 5, 2, 3, 5, 7, 1, 2, 4, 8, 7, 4, 2, 1}. Then, for points p=1, 2, 4, 8, and 0, the corresponding five splitting-signals of $\Gamma$ (f) are defined as follows $$f_{T_1} = \{f_0 - f_8, f_1 - f_9, f_2 - f_{10}, f_3 - f_{11}$$
$$f_4 - f_{12}, f_5 - f_{13}, f_6 - f_{14}, f_7 - f_{15}\}$$
$$= \{1, 1, -2, -3, -5, -1, 3, 6\}$$

$$f_{T_2} = \{f_0 - f_4 + f_8 - f_{12}, f_1 - f_5 + f_9 - f_{13}$$
$$f_2 - f_6 + f_{10} - f_{14}, f_3 - f_7 + f_{11} - f_{15}\}$$
$$= \{-6, -2, -1, 5\}$$

$$f_{T_4} = \{f_0 - f_2 + f_4 - f_6 + f_8 - f_{10} + f_{12} - f_{14}$$
$$f_1 - f_3 + f_5 - f_7 + f_9 - f_{11} + f_{13} - f_{15}\}$$
$$= \{-1, -9\}$$

-continued
$$f_{T_8} = f_0 - f_1 + \ldots + f_{14} - f_{15} = -8$$
$$f_{T_0} = f_0 - f_1 + \ldots + f_{14} - f_{15} = 58$$

And they compose the 16-point paired transform $$X'_{16} \diamond f = \{\underline{1, 1, -2, -3, -5, -1, 3, 6}$$
$$\underline{-6, -2, -1, 5}$$
$$\underline{-1, -9}$$
$$\underline{-8}$$
$$\underline{58}\}$$

Example 2

A 16-point convolution is shown here, in accordance with an embodiment of the present disclosure.

Let N=16 and let the impulse characteristic of the filter be $$y=\{0, \ldots, 0, 1/11, 2/11, 5/11, 2/11, 1/11, 0, \ldots 0\}$$

with value $y_8=5/11$ in the middle. The 16-point DFT of y(n) at point p=1 is $$Y_1 = -0.8491 - j0.3517 = |0.9191|\exp(-j2.7489).$$

So, $|Y_1|=0.9191$ and $\phi_1=-2.7489$ (in radians). Since, $2\pi/16=0.3927$, the following normalized phase may be obtained $$\bar{\phi}_1 = \phi_1/0.3927 = -7.$$

The frequency characteristic at point 1 can be written as $$Y_1 = 0.9191 W^7 \cdot W = W_{16} = \exp(-j2\pi/16).$$

Let $$f_n = \{2, 3, 2, 5, 2, 3, 5, 7, 1, 2, 4, 8, 7, 4, 2, 1\}$$

be the 16-point signal to be processed by the filter. The splitting-signal that corresponds to the point p=1

$$f'_{T_1} = \{f'_{1,0}, f'_{1,1}, f'_{1,2}, f'_{1,3}, f'_{1,4}, f'_{1,5}, f'_{1,6}, f'_{1,7}\}$$
$$= \{1, 1, -2, -3, -5, -1, 3, 6\}$$

should be shifted by, according to the operator $T^7$ that has the 8×8 matrix, $$T^7 = \begin{bmatrix} & & & & & & & -1 \\ & & & & & & -1 & \\ & & & & & -1 & & \\ & & & & -1 & & & \\ & & & -1 & & & & \\ & & -1 & & & & & \\ & -1 & & & & & & \\ 1 & & & & & & & \end{bmatrix} = -(T^1)^T$$

seven points to the right $$f'_{T_1} \to \{-f'_{1,1}, -f'_{1,2}, -f'_{1,3}, -f'_{1,4}, -f'_{1,5}, -f'_{1,6}, -f'_{1,7}, f'_{1,0}\}$$

$$= \{-1, +2, +3, +5, +1, -3, -6, 1\}$$

Therefore, the splitting-signal of the filtered signal is represented as $$f'_{T_1} = |Y_1|\{-1, 2, 3, 5, 1, -3, -6, 1\}.$$

The DFT of the degraded signal at point p=1 is calculated as $$\hat{F}_1 = |Y_1|\,|(-1)W_{16}^0 + (+2)W_{16}^1 + (+3)W_{16}^2 + (+5)W_{16}^3 + (+1)W_{16}^4 + (-3)W_{16}^5 + (-6)W_{16}^6 + (+1)W_{16}^7|$$

Indeed, the DFT of the signal f at point p=1 is $$F_1 = |(+1)W_{16}^0 + (+1)W_{16}^1 + (-2)W_{16}^2 + (-3)W_{16}^3 + (-5)W_{16}^4 + (-1)W_{16}^5 + (+3)W_{16}^6 + (6)W_{16}^7|$$

Multiplying $F_1$ by $Y_1 = |Y_1|W_{16}^7$, one can obtain $$Y_1 F_1 = |Y_1|\,|(+1)W_{16}^7 + (+1)W_{16}^8 + (-2)W_{16}^9 + (-3)W_{16}^{10} +$$

$$(-5)W_{16}^{11} + (-1)W_{16}^{12} + (+3)W_{16}^{13} + (6)W_{16}^{14}| =$$

$$\hat{F}_1 = |Y_1|\,|(+1)W_{16}^7 + (-1)W_{16}^0 + (+2)W_{16}^1 + (+3)W_{16}^2 +$$

$$(+5)W_{16}^3 + (+1)W_{16}^4 + (-3)W_{16}^5 + (-6)W_{16}^6|$$

Thus, the DFT of the degraded signal at points p=2k+1, k=1:(N/2−1), is calculated as $$\hat{F}_{2k+1} = |Y_1|\,|(-1) + (2W_{16}^1)W_8^k + (3W_{16}^2)W_8^{2k} + (5W_{16}^3)W_8^{3k} + (1W_{16}^4) W_8^{4k} + (-3W_{16}^5)W_8^{5k} + (-6W_{16}^6)W_8^{6k} + (1W_{16}^7) W_8^{7k}|.$$

One can process similarly the splitting-signal, if the phase $\overline{\phi}_1$ takes another values. For instance, if the phase $\overline{\phi}_1 = -3$, then the sequence $f'_{T_1}$ will be shifted (to the right) by operator $T^3$ that has the matrix $$T^3 = \begin{bmatrix} & & & & -1 & & & \\ & & & & & -1 & & \\ & & & & & & -1 & \\ 1 & & & & & & & \\ & 1 & & & & & & \\ & & 1 & & & & & \\ & & & 1 & & & & \\ & & & & 1 & & & \end{bmatrix}$$

If the phase $\overline{\phi}_1 = +3$, then the sequence $f'_{T_1}$ will be shifted (to the left) by operator $T^3$ that has the matrix $$T^{-3} = \begin{bmatrix} & 1 & & & & & & \\ & & 1 & & & & & \\ & & & 1 & & & & \\ & & & & 1 & & & \\ & & & & & 1 & & \\ -1 & & & & & & & \\ & -1 & & & & & & \\ & & -1 & & & & & \end{bmatrix}$$

Note, that $T^{-3} = (T^3)^T = -T^5$.

Example 3

A 256-point convolution is shown here, in accordance with an embodiment of the present disclosure.

Consider the signal f(t) of length N=256 shown in FIG. 3(a) and the smoothing filter with the impulse characteristic $$y = \{0, \ldots, 0, 1, 2, 5, 2, 1, 0, \ldots 0\}/11$$

shifted to the center N/2+1=129.

At nine points p=0 and p=$2^n$, n=0:7, the response function of the smoothing filter is represented by the values from the following table

|  | p | | | | | | | | |
|---|---|---|---|---|---|---|---|---|---|
|  | 0 | 1 | 2 | 4 | 8 | 16 | 32 | 64 | 128 |
| $|Y_p|$ | 1 | 0.9997 | 0.9987 | 0.9948 | 0.9792 | 0.0101 | 0.7117 | 0.2727 | 0.2727 |
| $\phi_p$ | 0 | −3.117 | 0.0491 | 0.0982 | 0.1983 | 0.3927 | 0.7854 | 1.5708 | 3.1416 |
| $\overline{\phi}_p$ | 0 | −127 | 2 | 4 | 8 | 16 | 32 | 64 | 128 |

The paired transform $\chi'[f]$ of the signal as well as its splitting into ($\log_2 N + 1 = 9$) short signals $$\chi'[f] = \{f'_{T_1}, f'_{T_2}, f'_{T_4}, f'_{T_8}, f'_{T_{16}}, f'_{T_{32}}, f'_{T_{64}}, f'_{T_{128}}, f'_{T_0}\}$$

are shown in FIG. 3(b).

According to this table, the short signals are processed in the following way: Step 1: (p=1) The first signal of length 128 is shifted cyclicly by 127 elements to the right (or, 1 element to the left), the signs of the first 127 components are changed, and all components are multiplied by $|Y_1|=0.9997$.

$$f'_{T_1} = \{f'_{1,0}, f'_{1,1}, f'_{1,2}, \ldots, f'_{1,125}, f'_{1,126}, f'_{1,127}\} \to \{f'_{1,1}, f'_{1,2}, \ldots, f'_{1,125}, f'_{1,126}, f'_{1,127}, f'_{1,0}\} \to \{-f'_{1,1}, -f'_{1,2}, \ldots, -f'_{1,125}, -f'_{1,126}, -f'_{1,127}, f'_{1,0}\} \times 0.9997.$$

Step 2: (p=2) The second signal of length 64 is shifted cyclicly by 1 (because $\overline{\phi}_2/2=1$) element to the left, the sign of the last component is changed, and all components are multiplied by $|Y_2|=0.9987$:

$$f'_{T_2} = \{f'_{2,0}, f'_{2,2}, f'_{2,4}, \ldots, f'_{2,122}, f'_{2,124}, f'_{2,126}\} \to \{f'_{2,2}, f'_{2,4}, \ldots, f'_{2,122}, f'_{2,124}, f'_{2,126}, f'_{2,0}\} \to \{f'_{2,2}, f'_{2,4}, \ldots, f'_{2,122}, f'_{2,124}, f'_{2,126}, -f'_{2,0}\} \times 0.9987.$$

Step 3: (p=4) The third signal of length 32 is shifted cyclicly by 1 (because $\bar{\phi}_4/4=1$) element to the left, the sign of the last component is changed, and all components are multiplied by $|Y_4|0.9948$:

$$f'_{T_4}=\{f'_{4,0}, f'_{4,4}, f'_{4,8}, \ldots, f'_{4,116}, f'_{4,120}, f'_{4,124}\} \rightarrow \{f'_{4,4}, f'_{4,8}, \ldots, f'_{4,116}, f'_{4,120}, f'_{4,124}, f'_{4,0}\} \rightarrow \{f'_{4,4}, f'_{4,8}, \ldots, f'_{4,116}, f'_{4,120}, f'_{4,124}, -f'_{4,0}\} \times 0.9948.$$

Steps 4-7: (p=8, 16, 32, 64) The next four signals of length 16, 8, 4, and 2 are shifted cyclicly by 1 (because $\bar{\phi}_p/p=1$) element to the left, the sign of the last components are changed, and all components are multiplied by $|Y_p|$ as follows:

$$f'_{T_8}=\{f'_{8,0}, f'_{8,8}, f'_{8,16}, \ldots, f'_{8,104}, f'_{8,112}, f'_{8,120}\} \rightarrow \{f'_{8,8}, f'_{8,16}, \ldots, f'_{8,104}, f'_{8,112}, f'_{8,120}, -f'_{8,0}\} \times 0.9792,$$

$$f'_{T_{16}}=\{f'_{16,0}, f'_{16,16}, f'_{16,32}, \ldots, f'_{16,94}, f'_{16,112}\} \rightarrow \{f'_{16,16}, f'_{16,32}, \ldots, f'_{16,94}, f'_{16,112}, -f'_{16,0}\} \times 0.9191,$$

$$f'_{T_{32}}=\{f'_{32,0}, f'_{32,32}, f'_{32,64}, f'_{32,96}\} \rightarrow \{f'_{32,32}, f'_{32,64}, f'_{32,96}, -f'_{32,0}\} \times 0.7117,$$

$$f'_{T_{64}}=\{f'_{64,0}, f'_{64,64}\} \rightarrow \{f'_{64,64}, -f'_{64,0}\} \times 0.2727.$$

Step 8: (p=128) The one-point signal $f'_{T_{128}}$ is processed as $$f'_{T_{128}}=\{f'_{128,0}\} \rightarrow \{-f'_{128,0}\} \times 0.2727.$$

Step 9: (p=0) The last one-point signal $f'_{T_0}$ is processed as $$f'_{T_0}=\{f'_{0,0}\} \rightarrow \{f'_{0,0}\} \times 1.$$

Figure 5:
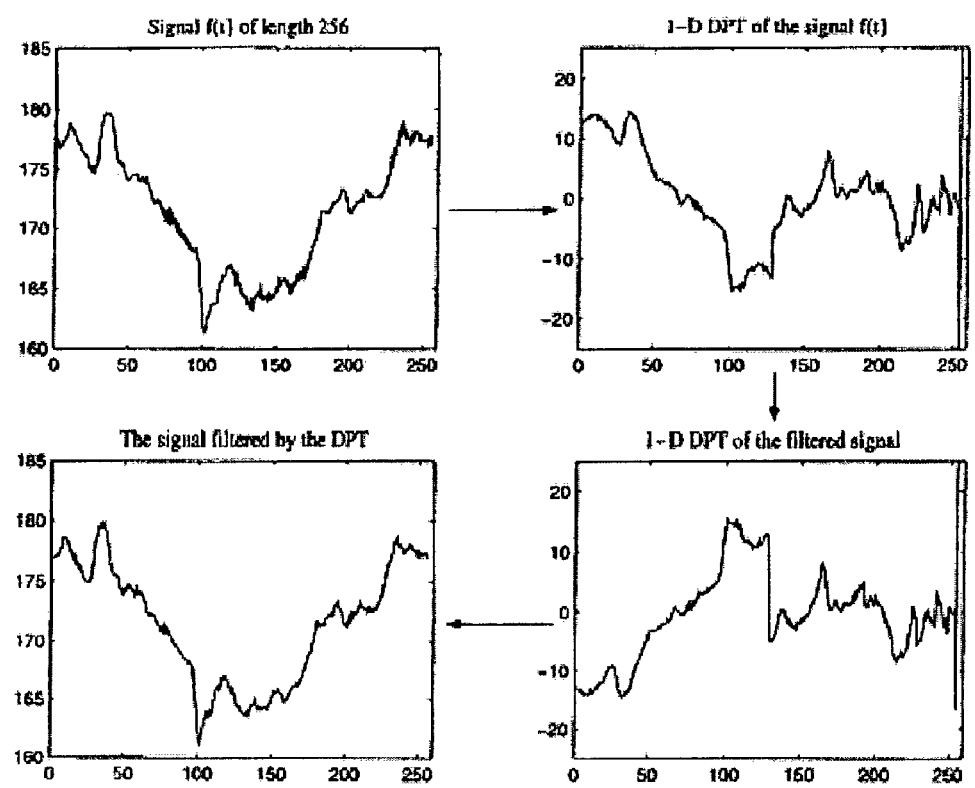
FIG. 5 shows a 256-point linear signal filtration by a paired transform, in accordance with an embodiment of the present disclosure.
Figure 6:
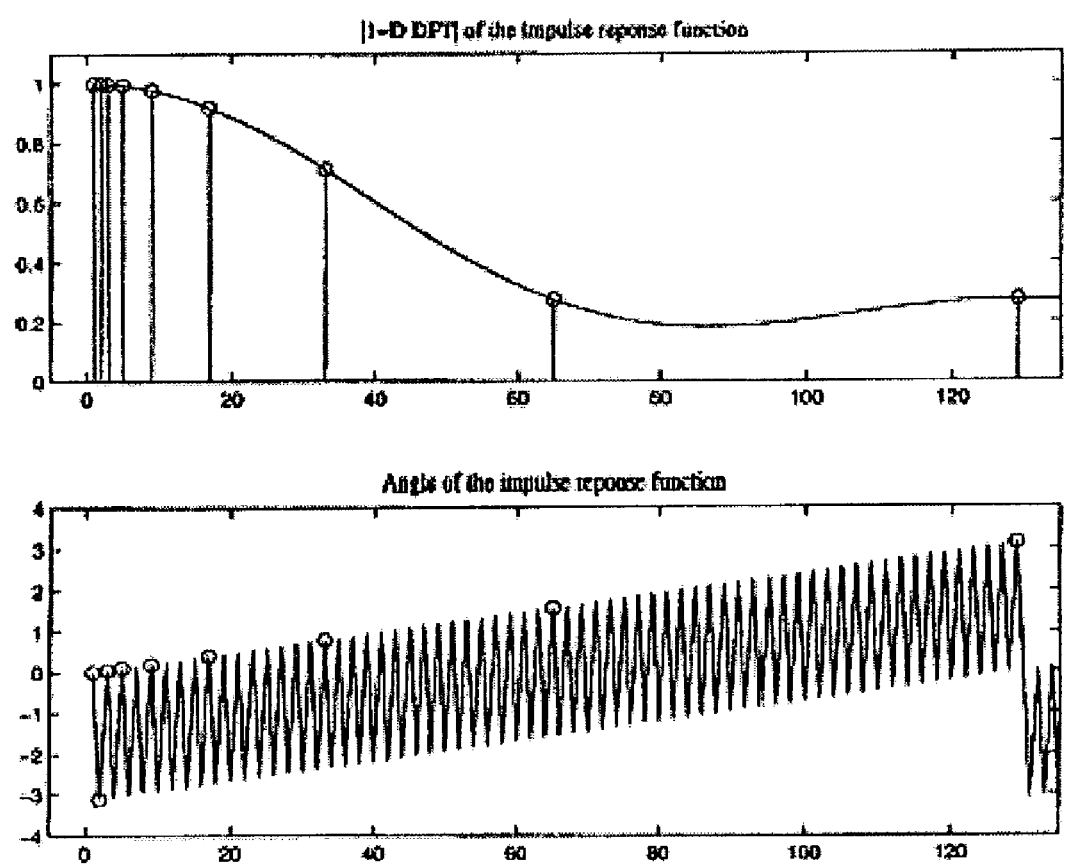
FIG. 6 shows Fourier characteristics of a linear filter.

The results of the above processing may be denoted by $$\chi'[g]=\{g'_{T_1}, g'_{T_2}, g'_{T_4}, g'_{T_8}, g'_{T_{16}}, g'_{T_{32}}, g'_{T_{64}}, g'_{T_{128}}, g'_{T_0}\}$$

which is the paired transform of the filtered signal. FIG. 5(d) shows the transform $\chi'[g]$ composed by the processed 9 signals. The inverse paired transform of $\chi'[g]$, or the filtered signal is shown in FIG. 5(c). The spectral characteristics of absolute value and phase of the filter, as well as the values that have been used (marked by circles) are shown in FIG. 6.

Example 4

Shown here is an embodiment of a MatLab implementation of convolution methods, in accordance with embodiments of this disclosure.

```
%   Call: dcc_realization.m
%   Dr. Art M. Crigoryan, EX UTSA 03/09-23/2002
%
%   1. This is the demo program to illustrate the realization
%   of the linear cyclic convolution (or linear filtration)
%
%         g(n)=f(n)*h|n|-sum _(k-1)^256 f(n-k)h|k|
%                n, k=1,2,3, ..., 256,
%
%   of signal f|n| with the sequence h|n| being the impulse
%   characteristic of the smoothing filter, which has the
%   form of the triangle (1 2 5 2 1) (normalized).
%   The program is based on the fast algorithms of the direct
%   and inverse paired transforms, (fpt_1d{} and fpt1_1d{}).
%   The Fourier transform H(w) of the impulse characteristics
%   is computed by the fast Fourier transform {fft()}
%
%         H[w]=sum_(n=0)^126 f(n)exp(=j2pi/256*nw)
%              w=0,1,2, ..., 255.
%
%   The code user only 9 values of H{w}, namely at points
%   w=1,2,4,8,16,32,64,128, and 0.
%
%   2. For comparison with the FFT method (that uses all 256
%   values of H[w]) the result of applying the FFT for the
%   convolution realization in also illustrated.
%
%   3. This program used the 1-D signal of length 256 written
%   in the file 'image_signal.sig'
%
%   4. Used codes:
%         fpt_1d{}  -- fast paired transform [Artycom]
%         fpti_1d{} -- inverse fast paired transform [Artyom]
%1.
%A. Reading the signal from file -----------------------
fid=fopen{'image_signal.sig' , 'rb'};
f=fread(fid, 256, 'double');  f=f';  fclose(fid);  clear fid:
N=length(f);   % N=256
% open the figure and display the original signal
f_dft1=figure('Position', (10 398 560 420), ...
      'Tag', 'FigD', ...
      'Name',' 1-D Signal decomposition v.1, Art M.G., 2002');
subplot(2,2,1);
plot(f);
text (230,158,'t');
b_title=title('Original signal of length 256');
set(h_title, 'FontName', 'Times', 'FontSize', 9);
axis([0,260,160,185]);
%B. Setting the impulse characteristic h(n) for 1-D filter
%      The triangle impulse of length 5 shifted to the center
h1=ones(1,5);
h1=[1 2 5 2 1];
s°sum(h1);
h1=h1/s;      % normalyzing the impulse
n1=length(h1);
L=(n1-1)/2;
LL=N/2;
h=zeros(1,N);
h(LL-L:LL+L)=h1;     % triangle is shifted to the center
H=fft(b,N);          % the N-point DFT of the sequence h(n)
%C. Compute log(N)+1 magnitudes and phases components of
%   transfer function that will be used by FPT method:
r1=log2 (N)+1;
H_only=zeroB(l,r1);   % for r1 absolute values of the filter
P_only=zeros(l,r1);   % for r1 phase values of the filter
p=1;
p_need(1)=p;
for k=2:r1
    p_need(k)=p+1;
    p=p*2;
end;
%p_need=[1,2,3,5,9,17,33,65,129];
H_only=abs(H(p_need));
P_only=angle(H(p_need));
%D. Normalizing the angles in P_only
%   Phase representation by dividing the unit circle by N parts
pn=2*pi/N;
P_only=round(P_only/pn);
fprintf(' %2.0f',P_only); fprintf(' \n ');
% 0 -127 2 4 8 16 32 64 128
fprintf('%6.4f ',H_only);
% 1.0000 0.9997 0.9987 0.9948 0.9792 0.9191 0.7117 0.2727 0.2727
%2. Performing the convolution - - - - - - - -
%A. Compute the paired transform of the signal f(n)
SP=fpt_1d(f);    % the N-point DPT of the signal
%B. Computing the DPT of the convoluted signal g(n)
SP_new=zeros(1,N);                  % for the output DPT
%a) computing two last components of the DPT of g(n):
p2-1;
SP_new(N) = SP(N)*H_only(1);        % component #N
N2-N/2;
T=1; if P_only(k)==N2 T=-1; end;
SP_new(N-1)= T* (SP(N-1))*H_only(r1);  % component #N-1
%b) computing the rest (N-2) components of the DPT of g(n):
n_1=1;
n_2=N2;
for k=2:log2(N)
    ph1-P_only(k);
    GT=zeros(1,N2);   % for split-signals or the DPT of f(n)
```

-continued

```
    GT(1:p2;N2)=SP(n_1:n_2):
    GP = zeros(1, N2);    % for split-signals of the DPT of g(n)
    M2=N2/p2;
    if phi < 0
        for m=1:p2:-phi
            GP(m) = -GT(M2+phi+m);
        end;
        m1-m;
        mm=1;
        for m=m1+p2:N2
            GP(m) -GT|mm);
            mm=mm+1;
        end;
    elseif phi >= 0
        for m=1:p2:N2-phi
            GP(m)=GT(ph1+m);
        end;
        m1=m;
        mm=1;
        for n=m1+p2:p2:N2
            GP(m) = -GT(mn);
            nm=mm+1;
        end;
    end;
    SP_new(n_1:n_2)=GP(1:p2:N2) *H_only(k);
    p2*p2*2;
    n_1=n_2+1;    n_2=n_2+M2/2;
end;
% To print DPTs of the original and filtered signals
fprintf(' %6.4f,',SP); fprintf(' \n ');
fprintf(' %6.4f,',SP_new);
%e) Displaying the results of the linear convolution
subplot (2,2,2);
plot(SP);
axis([0,260, -25,25]);
S_T=sprintf('1-D DPT of the signal f(t)');
h_title=title(S_T);
set(h_title,'Color','k','FontName','Times','FontSize',9);
subplot(2,2,4);
plot(SP_new);
%plot(fftshift(SP_new));
axis([0,260, -25,25]);
% hold on; plot(-SP, 'r');
S_T=sprintf('1-D DPT of the filtered signal');
h_title=title(S_T);
set(h_title,'Color','k','FontName','Times','FontSize',10);
f_new=fpti_ld(SP_new);
subplot(2,2,3);
plot(fftshift|f_new));
axis([0,260,160,185]);
hold on;
S_T=sprintf('The signal filtered by the DPT');
h_title=title(S_T);
set(h_title,'Color','k','FontName','Times','FontSize',9);
% print -dps filterPT_1.ps
% For comparison with the fast DFT method of the convolution
F*fft(f,N);    % the N-point DFT of the original signal
FC=F * H;
fc=ifft(FC);
fc_real=real(fftshift(fc));
plot(fc_real,'r');
% print -dpsc filterPT_1b.ps
%3. Draw the filter - - - - - - - - - - - - - - - - - - - -
f_dpt2-figure('Position',[10 398 560 420], ...
    'Tag','FigD', ...
    'Name',' 1-D Signal decomposition v.1. Art M.G., 2002');
%a) Plot the sbs. of the frequency characteristics of the filter
h_1=subplot(2,1,1);
plot(sbs(H));
axis([-5,135,0,1.1]);    %    h=[1 2 5 2 ]1/11
S_T=sprintf'|1-D DFT| of the impulse reponse function');
h_title=title(S_T);
set[h_title,'Color','k','FontName','Times','FontSize',10];
%b) Mark the value that were used by the FPT method
hold on;
for k=1:r1
    x1=p_need(k);
    h_o=plot(x1,H_only(k),'o');
    set(h_o,'Color',[1 0 0]);
```

-continued

```
    x2=[x1 x1], y2=[0,H_only(k)];
    h_line1=line(x2,y2,'LineStyle','-');
    set(h_line1,'Color',[1 0 0]);
end;
%e) Plot the phase of the filter
h_2=subplot[2,1,2];
plot(angle(H));
axis([-5,140,-4,4]);
S_T-sprintf('Phase of the impulse reponse function');
h_title=title[S_T];
set(h_title,'Color','k','FontName','Times','FontSize',10);
%d) Mark the values that were used by the FPT method
hold on;
for k=1:r1
    x1=p_need(k);
    h_o=plot(x1,angle(H(x1)),'o');
    set(h_o,'Color',[1 0 0]);
end;
% print -dps filterPT_2.ps
% Print separately the original and results of realization the
% linear convolution by the fast paired and rest methods.
f_dpt3-figure('Position',[10 398 560 420], ...
    'Tag','FigD', ...
    'Name',' 1-D Signal decomposition v.1, Art M.G., 2002');
h_1=subplot[3,1,1];
plot|f};
axis|[0,260,160,185]];
text{230,158,'t'|;
h_title-title('Original signal of length 256'|;
set(h_title,'FontName','Times','FontSize',9);
set(h_1,'FontSize',9);
h_2=subplot(3,1,Z|;
plot(fftshift[f_now]};
axis(|0,260,160,185]};
S_T=sprintf[('The signal filtered by the DPT');
h_title=title[S_T];
set(h_title,'Color','k','FontName','Times','FontSize',9);
set(h_2,'FontSize',9);
h_3=subplot (3,1,3);
plot[fe_real];
axis([0,260,160,185]};
S_T=sprintf('The signal filtered by the DFT');
h_title=title[S_T];
set (h_title,'Color','k','FontName','Times','FontSize',9);
set(h_3,'FontSize',9);
% print -dps filterPT_3.pa
```

Example 5

Shown here is an example of a MatLab program which implements a pair-transform calculation and an inverse transform calculation, in accordance with embodiments of this disclosure.

```
%    Call; B=fpt_1d(A)
%    1-D fast direct paired transform
%    A --> B of length N=2**M, M>1.
%
%    Artyom Grigoryan,Yetevan 1996
        function B=fpt_1d(A);
        ND=length(A);
        ND=log2(ND);
        B=A;
        LK=D;
        NK=ND;
        I=1;
        1I=1;
        while I <= MD
            NK=NK/2;
            LK-LK+NK;
            J=II;
            while J <- LK
                J1=J+NK;
```

-continued

```
        T=B[J1);
        T1=B(J);
        B(J1)=T1+T;
        B(J)=T1-T;
        J=J+1;
    end;
    II=LK+1;
    I=I+1;
end;
% Call; A=fpti_1d(B)
% 1-D fast inverse paired transform
% B --> A of length N=2**M, M>1
%
% Artyum Grigoryan,   Yerevan 1996
    function A=fpti_1d[B];
        A=B;
        ND=length[A];
        MD=log2 (ND);
        II=ND-1; NK=1;
        I=1;
        while 1 <= MD
            LK=ND+NK; J=II;
            while J <- LK
                J1=J+NK;
                T1=A(J);
                T2=A(J1);
                T=T1+T2;
                T1=T2-T1;
                A(J)=T/2.;
                A(J1)=T1/2.;
                J=J+1;
            end;
            NK=NK+NK;
            II=II-NK;
            I=I+1;
        end;
```

REFERENCES

Each of the following references is hereby incorporated in their entirety.

1. A. V. Oppenheim and R. W. Shafer, *Digital Signal Processing*, Prentice-Hall, Englewood Cliffs, N.J.: Prentice-Hall, 1989.
2. J. G. Prookis and D. G. Manolakis, *Digital Signal Processing: Principles, Algorithms, and Applications*, $3^{rd}$ ed., Englewood Cliffs, N.J.: Prentice-Hall, 1996
3. O. Ersoy, *Fourier-Related Transforms, Fast Algorithms and Applications*, Englewood Cliffs, N.J.: Prentice-Hall, 1997.
4. C. S. Burrus and T. W. Parks, *DFT/FFT and Convolution Algorithms: Theory and Implementation*, New York: Wiley, 1985.
5. M. T. Heidemann, *Multiplicative Complexity, Convolution, and the DFT*, New York: Springer-Verlag, 1988.
6. A. V. Oppenheim A. V. and R. W. Shafer, Digital signal processing, Prentice-Hall, Englewood Cliffs, N.J., 1989.
7. J. G. Prookis and D. G. Manolakis, Digital signal processing: Principles, Algorithms, and Applications, 3rd ed., Prentice-Hall Inc., 1996.
8. O. Ersoy, Fourier-Related Transform, Fast Algorithms and Applications. Prentice Hall, 1997.
9. C. S. Burrus and T. W. Parks, DFT/FFT and convolution algorithms: Theory and Implementation, New York, Wiley 1985.
10. M. T. Heidemann, Multiplicative complexity, convolution, and the DFT, New York: Springer-Verlag, 1988.
11. H. J. Nussbaumer, Fast Fourier transform and convolution algorithms, 2nd ed., Springer-Verlag, Berlin, 1982.
12. J. G. Prookis and D. G. Manolakis, Digital signal processing: Principles, Algorithms, and Applications, 3rd ed., Prentice-Hall Inc., 1996.
13. T. G. Stockham, Highspeed convolution and correlation, in 1966 Spring Joint Computer Conf., AFIPS Proc. 28, pp. 229-233.
14. B. Gold, C. M. Rader, A. V. Oppenheim, T. G. Stockham, Digital processing of signals, McGraw-Hill, New York 1969, pp. 203-213
15. R. C. Agarwal, J. W. Cooley, New algorithms for digital convolution, in 1977 Intern. Conf., Acoust., Speech, Signal Processing Proc., p. 360.
16. R. C. Agarwal, C. S. Burrus, Fast one-dimensional digital convolution by multidimensional techniques, IEEE Trans. ASSP-22, pp. 1-10, 1974.
17. A. M. Grigoryan, "New algorithms for calculating the discrete Fourier transforms," Vichislit. Matem. i Mat. Fiziki, AS USSR, 1986, vol. 26, no. 5, pp. 84-88.
18. A. M. Grigoryan, "2-D and 1-D multipaired transforms: Frequency-time type wavelets," IEEE Trans. Signal Processing, vol. 49, no. 2, pp. 344-353, February 2001.
19. A. M. Grigoryan and S. S. Agaian, "Split manageable efficient algorithm for Fourier and Hadamard transforms," IEEE Transaction on Signal Processing, January 2000, vol. 72, no. 1, pp. 172-183.
20. A. M. Grigoryan, "New algorithms for calculating the discrete Fourier transforms," Vichislit. Matem. i Mat. Fiziki, AS USSR, 1986, vol. 26, no. 5, pp. 84-88.

What is claimed is:

1. A method for cyclic convolution comprising:
    obtaining a signal;
    calculating a paired transform of the signal;
    grouping components of the paired transform to form a plurality of splitting-signals, wherein each of the splitting-signals comprises a plurality of elements;
    shifting the plurality of elements of each of the plurality of splitting signals to create a plurality of shifted signals;
    multiplying the plurality of shifted signals by a plurality of moduli of corresponding Fourier transforms to create a result; and
    calculating an inverse paired transform of the result to filter the signal.

2. The method of claim 1, wherein the paired transform is calculated in accordance with equation:

$$\{\{\chi'_{2^n,2^n_t}; n=0:(r-1), t=0:(2^{r-n-1}-1)\}, 1\}$$

where n equals $\log_2$ (N), N is a length of the signal, t is an integer variable that runs from 0 to N−1, r is another integer variable that runs from 0 to n−1, and $\chi'_{p,t}$ is determined in accordance with equation:

$$\chi'_{p,t}(n) = \chi_{p,t}(n) - \chi_{p,t+N/2}(n)$$

where $\chi_{p,t}$ is characterized as:

$$x_{p,t}(n) = \begin{cases} 1, & \text{if } np = t \bmod N \\ 0, & \text{otherwise,} \end{cases} \quad n = 0:(N-1).$$

3. The method of claim 1, wherein the plurality of splitting signals are determined for points p from 0 to N−1, where N is a length of the signal.

4. The method of claim 3, wherein points p are related to r in accordance with the equation:

$$p=2^r, \quad r=0:(n-1), \text{ (and } p=0)$$

where n is equal to $\log_2$ N.

5. The method of claim 1, wherein each of the plurality of splitting signals are shifted by $\bar{\phi}$ elements, where $\bar{\phi}$ is a value of a normalized phase of one of the plurality of Fourier transforms.

6. The method of claim 5, wherein the value of the normalized phase is determined in accordance with equation:

$$\bar{\phi}=\phi/(2\pi/N)$$

where $\phi$ is a phase of the Fourier transform, and N is a length of the signal.

7. The method of claim 5, wherein shifting further comprises shifting the plurality of elements to the right when $\bar{\phi}$ is negative, and shifting the plurality of elements to the left when $\bar{\phi}$ is positive.

8. The method of claim 1, wherein shifting further comprises reversing the sign of at least one of the plurality of elements.

9. The method of claim 1, wherein calculating an inverse paired transform comprises calculating an inverse to an unitary paired transforms.

10. The method of claim 9, further comprising multiplying the inverse unitary paired transform by the result.

11. A computer readable media comprising instructions encoded therein for causing a computer system to perform steps comprising:
- calculating a paired transform of a signal;
- grouping components of the paired transform to form a plurality of splitting-signals;
- shifting the plurality of splitting signals;
- multiplying the plurality of splitting signals by a plurality of corresponding Fourier transforms; and
- calculating an inverse paired transform of the plurality of splitting signals.

12. A method for cyclic convolution comprising:
- obtaining a signal;
- steps for calculating a paired transform of the signal;
- steps for grouping components of the paired transform to form a plurality of splitting-signals;
- steps for shifting the plurality of splitting signals;
- steps for multiplying the plurality of splitting signals by a plurality of moduli of corresponding Fourier transforms; and
- steps for calculating an inverse paired transform of the plurality of splitting signals to filter the signal.

* * * * *

UNITED STATES PATENT AND TRADEMARK OFFICE
CERTIFICATE OF CORRECTION

| | | |
|---|---|---|
| PATENT NO. | : 7,346,498 B2 | Page 1 of 1 |
| APPLICATION NO. | : 10/356398 | |
| DATED | : March 18, 2008 | |
| INVENTOR(S) | : Artyom M. Grigoryan | |

It is certified that error appears in the above-identified patent and that said Letters Patent is hereby corrected as shown below:

In claim 9, column 23, line 21, please delete "transforms" and insert --transform-- therefor.

Signed and Sealed this

Tenth Day of November, 2009

David J. Kappos
*Director of the United States Patent and Trademark Office*